Aug. 24, 1965        L. B. BRUBAKER            3,202,086
                     HAM RACK ASSEMBLY
Filed Sept. 19, 1962                     2 Sheets-Sheet 1

INVENTOR
LEE B. BRUBAKER
BY
ATTORNEY

Aug. 24, 1965
L. B. BRUBAKER
3,202,086
HAM RACK ASSEMBLY
Filed Sept. 19, 1962
2 Sheets-Sheet 2
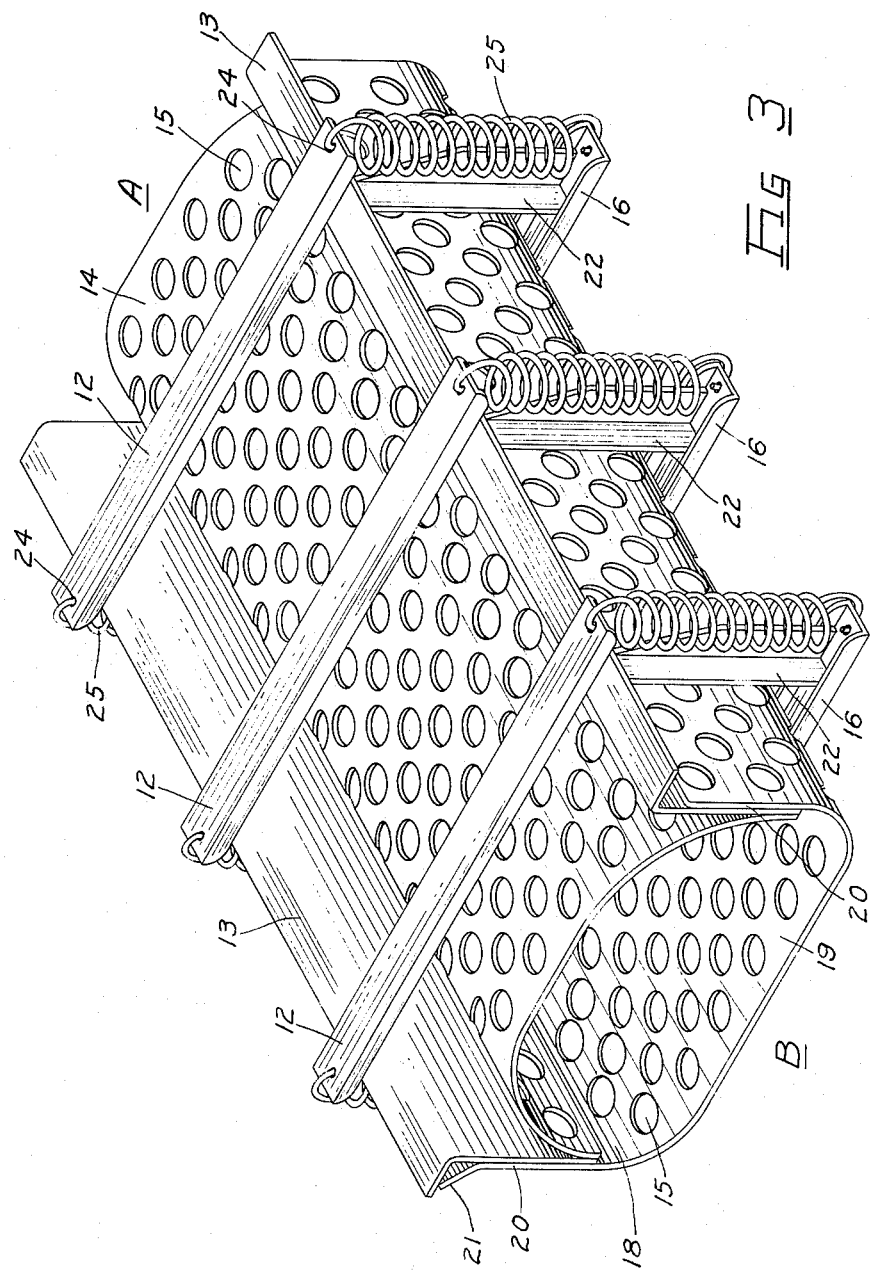
INVENTOR
LEE B. BRUBAKER
BY
ATTORNEY 3,202,086
HAM RACK ASSEMBLY
Lee B. Brubaker, 22 Ohio Drive, Decatur, Ill.
Filed Sept. 19, 1962, Ser. No. 224,711
2 Claims. (Cl. 99—351)

This invention relates to a Ham Rack Assembly.

An object of the invention is to provide a ham rack assembly in which boneless meat is shaped, cooked and smoked in one operation.

Another object of the invention is to give to boned meat through the smoking and cooking and under proper temperature in a regulated smoke house, the shape of an unboned ham plus the natural flavor of smoking in wood.

A further object of the invention is to give to the product of this rack assembly a far superior flavor and shape to that of the canned ham in which imitation smoke or liquid smoke is used in the can. Likewise, a boned ham or any other meat product with an artificial casing covering cannot be smoked because the smoke cannot penetrate the casing.

A still further object of the invention is that the product made by the rack assembly is one with a true ham shape and flavor which can be cut as desired by a merchant.

In the drawings accompanying and forming part of this specification:

FIG. 3 is a perspective view of the rack assembly.

Similar characters of reference indicate corresponding parts in the several figures of the drawings.

The rack assembly of this invention comprises an upper section A and a lower section B.

Figure 1:
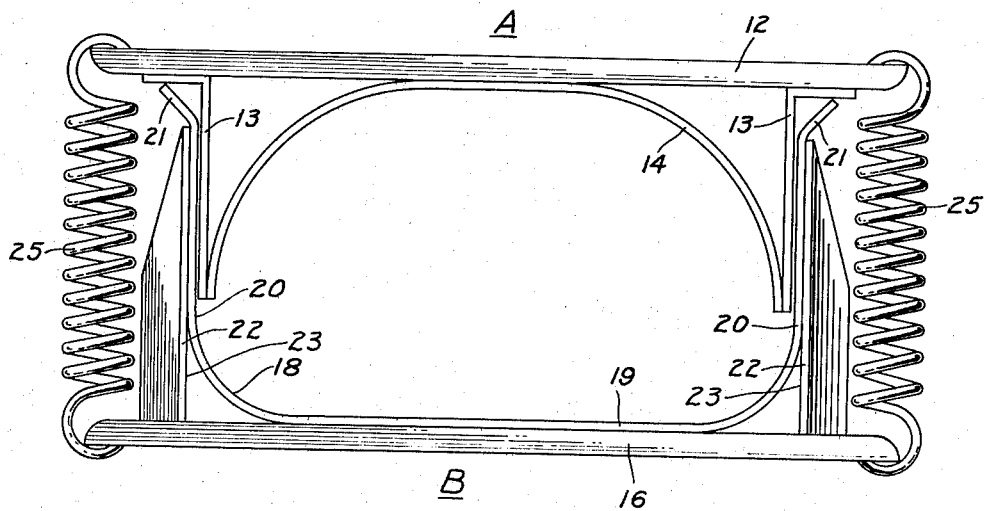
FIG. 1 is an end view of the rack assembly.
Figure 2:
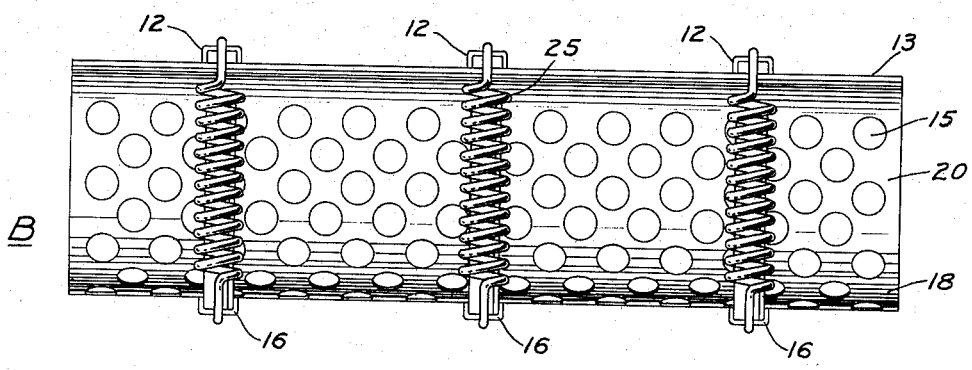
FIG. 2 is a side view thereof.

As seen in FIGS. 1 and 3 of the drawings, the upper section A comprises three crossbars 12, the same being equally spaced apart and connected by side bars 13 positioned at right angles to the crossbars 12. The side bars 13 are L-shaped as shown in FIGS. 1 and 3 of the drawings.

As shown in FIGS. 1 and 3, attached to the underside of the crossbars 12 is a semi-circular metal shell 14 having perforations 15 therein. Both the side bars 13 and the shell 14 are welded on the lower side of the crossbars 12 and the side bars 13 extend downwardly from the upper portion A of the ham rack assembly the same distance as the edges of the semi-circular perforated shell 14.

The lower section B of the ham rack assembly comprises three crossbars 16 the same length as the crossbars 12 on the upper section A. The crossbars 16 of the lower section B are attached to the perforated shell 18 in the same position that the crossbars 12 of the upper section A are attached to the shell 14.

The perforated shell 18 of the lower section B has a flattened bottom 19 substantially following the crossbars 16 with parallel sides 20 whose upper edges diverge at 21.

Attached to the lower crossbars 16 at each end thereof are uprights 22, the inner surfaces 23 of which are flattened, the purpose of which will be described later.

Adjacent the ends of each of the crossbars 12 and 16 are perforations 24 (see FIG. 3) to receive the ends of coiled springs 25, three of which are used on each side of the crossbars 12 and 16, to urge together the upper and lower sections A and B of the ham rack assembly at all times and as the meat within the rack shrinks as the same is cooked and/or smoked.

The perforated shell 14, the crossbars 12 and the side bars 13 from the unitary upper section A of the ham rack assembly.

The lower section B of the ham rack assembly comprises the crossbars 16, the uprights 22 and the perforated metal shell 18, all securely welded together.

As shown in the drawings, the springs 25 urge the top section A and the bottom section B together, the upper section A being received within the lower section B, and this action takes place as the meat product is cooked or smoked and thus shrinks.

The inner surface 23 of the uprights 22 attached to the crossbars 16 of the lower section B, functions to provide side support to the parallel side 20 of the lower shell 18 and the lower portion of the side bars 13 where these elements overlap each other. The aggregation of the above elements stiffens the lower edges of the shell 14 of the upper section A of the ham rack assembly.

To prepare ham for the most beneficial result in the finished product, using the subject matter of this ham rack assembly, first remove the outer skin of the ham, all excess fat and the several bones in the ham. The boned ham is then twisted into a roll and skewer criss-crossed with a ham needle to hold the incision made in the ham when the bones were removed.

Then slip the rolled ham into a double stockinette and tie it tightly so that the boned ham fits into the stockinette. Then place the rolled ham in the lower section B of the ham rack assembly with the sewing or the inside of the ham facing down on the bottom perforated metal shell 18. Then place the top section A over the ham and connect springs 24 between the crossbars 12 and 16.

To cook and/or smoke the product at the same time, place the ham rack assembly with the product therein in a properly heated smoke house applying smoke the same time as applying heat, because the structure of the ham rack assembly has open ends and perforations in the shell structure which allow both the heat and smoke to penetrate the product contained within the ham rack assembly.

While the product used in the ham rack assembly has been stated to be ham, other products such as hog shoulder meat, turkey, roast beef or chicken, could also be used.

As will be seen from the drawings, the perforations 15 in the shells 14 and 18, cover the greater portion of the shells. Therefore, heat for cooking and smoke when used for smoking, can come in contact with the meat within the ham rack assembly, thus cooking and smoking the same.

The metal used in this ham rack assembly is stainless steel. Therefore, when the same is tarnished by use, it can be easily cleaned with a brush and water.

Having described my invention, what I claim as new and desire to secure by U.S. Letters Patent is:

1. In a ham rack assembly, the combination of a first upper section comprising a semi-circular shell having perforations therein, said shell having on its outer surface parallel spaced bars of a greater width than the length of the shell, a second lower section having bars of the same character as that of the first section, uprights adjacent the ends of each bar acting as lateral supports for the sides of the lower shell, with tensioning means comprising springs connecting the ends of the bars of the upper section and the ends of the bars of the lower section.

2. The structure according to claim 1, wherein the shell of the lower section has a flatter outside surface than the shell of the upper section.

(References on following page)

References Cited by the Examiner

UNITED STATES PATENTS

| | | | |
|---|---|---|---|
| 789,805 | 9/05 | Kurlfinke | 99—350 |
| 1,687,415 | 10/28 | Wolf | 99—351 |
| 2,059,938 | 11/36 | Farber | 100—265 |
| 2,431,253 | 11/47 | Hoy | 99—351 |
| 2,597,592 | 5/52 | Minder | 99—351 |
| 3,011,895 | 12/61 | Toepper | 99—107 |
| 3,036,922 | 5/62 | Slaverslak | 99—107 |

FOREIGN PATENTS

| | | |
|---|---|---|
| 465,708 | 4/14 | France. |
| 725,854 | 5/32 | France. |
| 1,237,358 | 6/60 | France. |
| 451,756 | 9/49 | Italy. |

ROBERT E. PULFREY, *Primary Examiner.*

LOUIS A. MONACELL, EUGENE R. CAPOZIO,
*Examiners.*